Dec. 13, 1955  FITZ-HUGH B. MARSHALL  2,727,183
RADIATION DETECTOR OF THE SCANNING TYPE
Filed Dec. 22, 1948
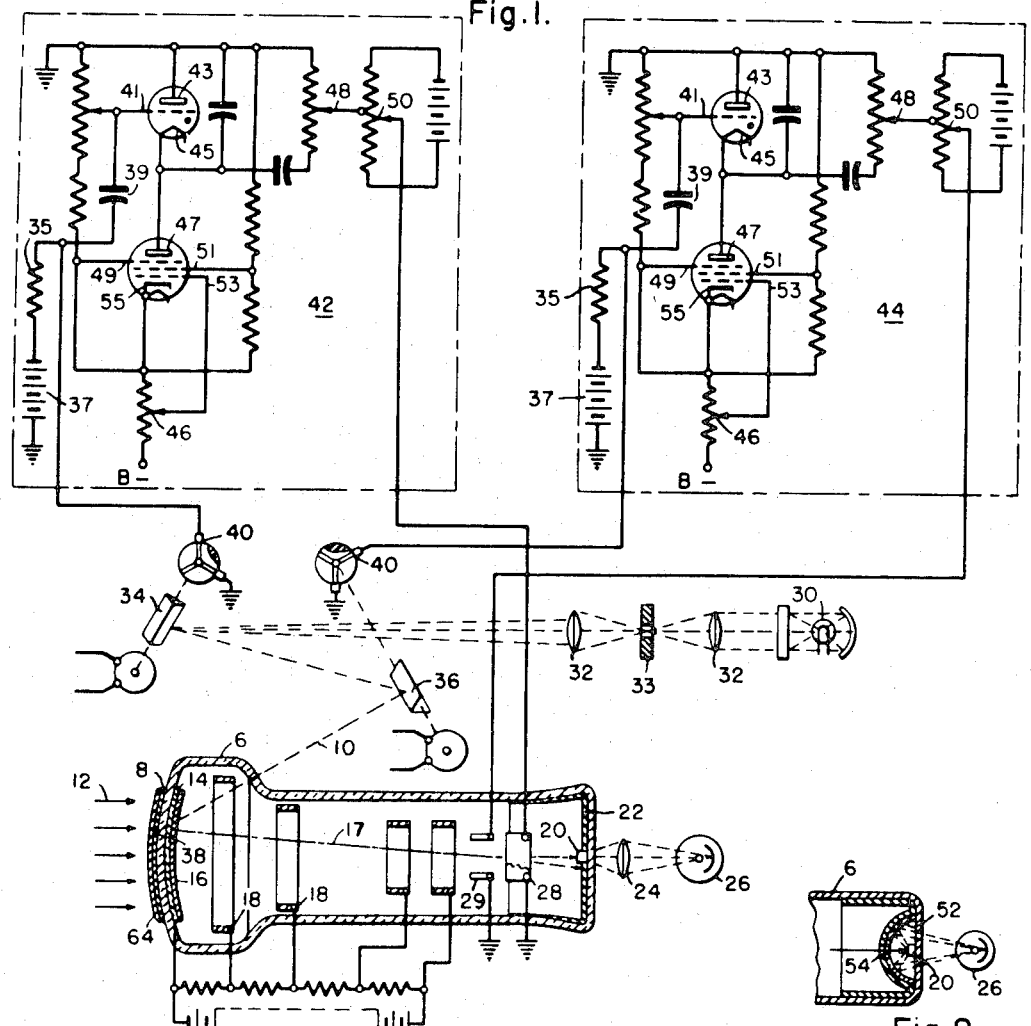
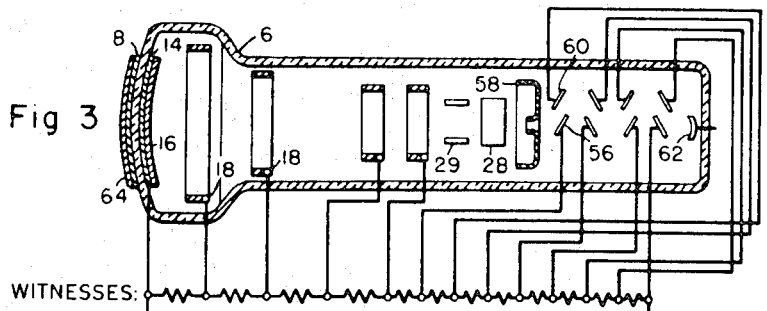
INVENTOR
Fitz-Hugh B. Marshall.
BY
ATTORNEY

2,727,183

RADIATION DETECTOR OF THE SCANNING TYPE

Fitz-Hugh B. Marshall, Glenshaw, Pa., assignor to Westinghouse Electric Corporation, East Pittsburgh, Pa., a corporation of Pennsylvania Application December 22, 1948, Serial No. 66,794

21 Claims. (Cl. 315—11)

My invention relates to the detection of radiation and more particularly to the detection of high energy radiation such as alpha, beta, gamma, and X-rays.

In the prior-art devices of which I am aware, considerable difficulties have been encountered in avoiding the dark current effects which are inherent in sensitive photo-electric surfaces and associated electron multipliers. By dark current, I mean that current which is present in the tube when no radiation is incident on the input phosphor. Attempts have been made to overcome this by obtaining better phosphor photo-electric surface combinations but the possibilities of this method are limited by the materials available. To some extent, this effect was overcome in the copending Patent 2,612,610, issued September 30, 1952. This device greatly increases the proportion of signal current to dark current but still continues to detect substantially all of the dark current.

It is accordingly an object of my invention to provide radiation detection which shall deliver high current with a minimum of dark current effect when detecting high energy radiation impressed at a low duty cycle.

Another object of my invention is to provide apparatus for the detection of high energy radiation delivered at a low duty cycle which shall have a substantially imperceptible dark current effect.

In accordance with the present invention, I provide a radiation detector including a storing phosphor which is capable of storing a large amount of energy and which stores this energy over relatively long periods until stimulated by stimulating radiation and which releases this energy rapidly as light when stimulated by the stimulated radiation. This stimulating radiation is any type of radiant energy which expedites the release of light from a phosphor. This may be infrared radiation or radiation of other wavelengths which will expedite the release of light and which can be separated from ordinary light by optical filters or by comparable means. Heat, even though not transmitted as radiant energy, is an alternative method of stimulation and is meant to be included within the scope of the expression, stimulating radiation, used herein.

The electrons emitted by the photo-electric surface are focused by electric or magnetic fields so that they form a pattern on a receiving surface at the opposite end of the tube corresponding to the radiation pattern on the input storing phosphor. Before reaching the receiving surface, the electrons pass through a set of deflecting electrodes which vary the direction of the electrons according to the potentials applied to the electrodes.

Focused on the storing phosphor is a small beam of stimulating radiation. This beam is caused to scan successively every element of area of the storing phosphor. As a beam of stimulating radiation impinges on an elementary area of the storing phosphor light photons to which the photo-electric layer is sensitive are emitted from that area. When these light photons strike the photo-electric layer, electrons are given off as described above, which electrons are caused to move through the tube toward the receiving surface. If no potential were applied to the deflecting electrodes, the electrons from a non-central area element would strike the receiving surface at a point located some distance from the center of the receiving surface. The distance of the point of impact on the receiving surface from the center of the receiving surface would be essentially proportional to the distance which the aforementioned elementary area on the storing phosphor is from the center of the storing phosphor. In the center of the receiving surface is an electron phosphor of small area. It is desired that the electrons emitted by the elementary area on the storing phosphor which is illuminated by the stimulating radiation at a time "$t$" will impinge on this electron phosphor, while the electrons from other areas will strike the absorbing surface around this phosphor. To achieve this, the electron beam is deflected by the deflecting electrodes in such a manner as to cause the electrons emitted from the photo-electric layer by the action of the photons produced by the elementary area of the storing phosphor which is illuminated by the stimulating radiation to impinge on the electron phosphor. This necessitates a coordination between the location of the point where the stimulating radiation is incident on the storing phosphor and the potentials on the deflecting electrodes. This coordination may be achieved by attaching electrical contacts to the rotating mirrors which cause the stimulating radiation to scan the storing phosphor. These contacts would cause a time reference pulse of current to pass through sweep generator circuits at certain times during the rotation of the mirrors. The sweep generators then control the potentials on the deflecting electrodes so that the potential on the deflecting electrodes are synchronized with the scanning beam of stimulating radiation.

The electrons produced as dark current from areas other than that which is receiving the stimulating radiation will not be deflected by the correct amount to cause them to impinge on the electron phosphor on the receiving surface and will impinge on other parts of the receiving surface. These other parts of the receiving surface will absorb the electrons without secondary emission thus destroying the effect of the dark current introduced in any part except the particular elementary area on which the stimulating radiation is incident at any particular time.

The electron phosphor on the receiving surface will emit light photons which will pass through the envelope in one embodiment of my invention where they will be received by a photo-multiplier.

In another embodiment of my invention, the electrons from the elementary area on the storing phosphor which is flooded by a stimulating radiation can be made to impinge on an electrode of small effective area. This electrode is capable of secondary emission and will emit more electrons which will be accelerated to other electrodes also capable of secondary emission successively until they finally impinge on an anode as a greatly amplified signal.

According to the broader aspects of my invention where it is desired to detect radiation for which a suitable storing phosphor is not readily available, additional layers may be placed in front of the storing phosphor, one of which is sensitive to the radiation to be tested. If the first layer does not emit radiation to which the storing phosphor is sensitive, then a second layer may be inserted which is sensitive to the radiation emitted by the first layer and which will emit radiation to which the storing phosphor is sensitive.

The novel features that I consider characteristic of my invention are set forth with particularity in the appended claims. The invention itself, however, both as to its organization and its method of operation together with additional objects and advantages thereof will best be read in connection with the accompanying drawing, in which:

Figure 1 is a schematic showing of a broad-beam radiation detector suitable to embody the principles of my invention for certain purposes.

Fig. 2 is a schematic showing of the receiving surface and light reflecting mirror employed in one embodiment of my invention.

Fig. 3 is a schematic showing of a broad-beam radiation detector employing a secondary emission electrode in place of the electron phosphor shown in Fig. 1, with successive amplifying electrodes as an integral part of the tube.

Referring in detail to the drawing, an envelope 6 of glass or other transparent material is coated with a storing or input phosphor 8 sensitive to the radiation to be detected, over a relatively large area at one end of the tube. This storing phosphor 8 should be capable of storing energy over a relatively long period until stimulated by the stimulating radiation 10 and should be capable of releasing this energy rapidly as light photons when stimulated by the stimulating radiation 10. The energy which is stored is that of the detected radiation 12. There are several phosphors now available commercially, such as zinc sulphide or cadmium zinc sulphide which show this property to a degree. Another example is a strontium sulphide phosphor with cesium-samarium activators, developed at the University of Rochester and known as Standard VII. Inside the tube opposite the storing phosphor is a transparent conducting layer 14 such as the material manufactured by Pittsburgh Plate Glass Company under the name of Nesa. Toward the interior of the envelope from the transparent conducting layer 14 is a photo-electric layer 16 sensitive to the light photons emitted by the storing phosphor 8 and capable of emitting electrons 17 immediately as a result of said light photons impinging on it. Inside the envelope are a series of field electrodes 18 which produce a field in the path of the electrons which will cause them to focus. This focusing procedure is old in the art and generally known as electron optics. On the inside of the tube at the opposite end from that on which the storing phosphor is a receiving surface, the receiving surface consists of two parts, a center small area of electron phosphor 20 and the remaining area of an absorbing material 22. The electron phosphor is capable of absorbing the elecrons and emitting light as a result thereof. Such phosphors are well known in the art, one of which is zinc sulphide. The absorbing surface 22 is capable of absorbing the electrons with substantially no secondary emission. An example of such an absorbing material is graphite. There may also be over the back of the electron phosphor receiving surface a layer 23 of aluminum thin enough to pass the electrons but sufficient to reflect light emitted by the phosphor and thus to conserve this light while preventing it from feeding back into the tube to the photo-electric surface of the input of the tube. On the outside of the envelope 6 near the electron phosphor 20, is a photo-multiplier tube 26 and a lens 24 for focusing light emitted by the electron phosphor 20 on the photo cathode of the photo-multipler tube 26. The photomultiplier tube 26 is old in the art and is employed here merely as one of several means of changing the pulse of light photons to a pulse of electrons and of amplifying the pulse of electrons. The output from tube 26 may be fed into a current registering device, as for example a milliammeter. Between the receiving surface 20 and the field electrodes 18 are a set of vertical and horizontal deflecting electrodes 29, 28 with their planes substantially parallel to the direction of motion of the electrons. These deflecting electrodes 28, 29 are capable of changing the direction of the electrons coming from the photo-electric surface 16 according to the potentials applied to them.

External to the envelope 6 is a source of stimulating radiation 30 such as infrared of about 10,000 angstroms if cesium-samarium activated strontium sulphide is used as the storing phosphor. Behind the source of stimulating radiation is a reflector and in front of it are a series of lenses 32 and apertures 33 for focusing the radiation into a small beam. The small beam of stimulating radiation is caused to impinge on a polysided revolving mirror 34. The number of sides is not critical but three are indicated in the figure. The radiation from this mirror is reflected onto a second polysided revolving mirror 36 from which it is again reflected onto the storing phosphor 8. These mirrors 34, 36 are at approximately right angles to each other and by rotating the first mirror 34 more rapidly than the second mirror 36, I cause the beam of stimulating radiation to scan the storing phosphor 8 with successive lateral strokes. Thus only a small area 38 of the storing phosphor is caused to emit its stored energy as light at any one time.

If the potentials on the deflecting electrodes 28 are zero, the electrons produced in the photo-electric layer by the photons from the elementary area 38 on which the stimulating radiation 10 is incident will strike the receiving surface 20, 22 a distance from the center of the receiving surface which is roughly proportional to the distance of the aforementioned elementary area 38 on the storing phosphor 8 from the center of the storing phosphor. As it is desired to detect the electrons emitted as a result of release of photons from the storing phosphor 8 by the stimulating radiation 10, it is necessary that the beam of electrons 17 be deflected in such a way that they will be the ones which will impinge on the electron phosphor 20. A coordination or synchronizing between the scanning of the stimulating radiation and the potentials on the deflecting electrodes is, therefore, necessary. This coordination may be produced by contacts 40 attached to the mirrors 34, 36 which allow a current to pass through during certain periods of the rotation of the mirrors. The currents which pass through the contacts 40 are caused to enter sweep generator circuits 42, 44 as shown in Fig. 1. The currents passing through the contacts attached to the mirrors cause sweep cycles of the sweep generator circuits to produce a pulse periodically while the mirrors are at particular positions. The horizontal scanning mirror 34, its sweep generator 42 and the horizontal deflecting electrodes 28 are thus synchronized together while the vertical scanning mirror 36, its sweep generator 44 and the vertical deflecting electrodes 29 are synchronized together.

In the sweep generator shown in Fig. 1, one side of the contact attached to the mirror is connected to ground while the other side is connected through a resistance 35 and a battery 37 to ground. Connected to the contact of the mirror through a condenser 39 is the grid 41 of a thyratron. The grid of the thyratron is also connected through a resistance direct to ground. The plate 43 of the thyratron is connected to ground and the cathode 45 is connected to the plate of a pentode 47. One grid 49 of the pentode is connected through a resistance to the grid of the thyratron. A second grid 51 of the pentode is connected through a resistance to ground and through another resistance to the cathode of the pentode. A third grid 53 of the pentode is connected through a resistance to the cathode 55 of the pentode. The third grid 53 of the pentode is connected through another resistance to the negative terminal of a battery which in turn is connected to ground.

The cathode 45 of the thyratron is connected through a condenser and a resistance to ground. A variable contact 48 is connected to this last resistance and through a variable source of potential 50 to a deflecting electrode 28. The opposite deflecting electrode is connected to ground.

The mirrors and light source shown in Fig. 1 could be replaced in one embodiment of my invention by a cathode ray tube which would cause the scanning of an electron phosphor with an electron beam. The electron phosphor is capable of emitting light to which the storing phosphor 8 is sensitive. By the use of lenses, an image of the cathode ray screen would be formed on the storing phosphor 8 by the stimulating radiation emitted by the cathode ray tube.

The sweep generators 42, 44 shown in Fig. 1 emit saw-tooth linear wave potentials which are applied to the deflecting electrodes 28, 29. This saw-tooth potential produces a field between two of the deflecting electrodes which jumps from zero to positive and then diminishes linearly with time until zero potential is again reached. Since there are two sweep generators, each coordinated with one of the rotating mirrors, we are able to control the potential between the plates of each set of deflecting electrodes 28, 29. The potentials across the plates produce a field which causes a deflection of the electrons 17 in the tube both horizontally and vertically. Frequency may be adjusted by varying the grid potential 46 of the oscillator tube, amplitude by the variable contact 48 in the output line, and centering by the potential 50 applied to the output line after leaving the sweep generator. Phase may be adjusted by changing the location of the contact points 40 with respect to the mirrors 34, 36.

It will be noted that since it is only electrons generated by energy emanating from the moving trace 38 of the scanning beam which are incident on the small receiving phosphor 20, and that trace is incident on a given area of the screen 8 only during one short interval in each scanning cycle, electrons generated by energy emanating from a given area of screen 8 are incident on receiving surface 20 only at the time intervals equal to the scanning period.

In accordance with the broader aspects of my invention, as shown in Fig. 2, the light photons emitted by the electron phosphor 20 may be substantially prevented from feeding back into the tube and very efficiently collected by a reflecting mirror 52 between the electron phosphor 20 and the control electrodes 28. It is, of course, necessary to have an aperture 54 in this mirror to allow the electrons to pass through so that they may impinge on the electron phosphor 20, but this aperture may be small enough to make unnecessary any further reflecting backing of the electron phosphor. The presence of this mirror prevents radiation from returning to the photo-electric layer 16 at the other end of the tube and it provides an unusually efficient means of collecting the light and causing it to enter the photo-multiplier tube 26.

In another embodiment of my invention as shown in Fig. 3, an electrode 56 of effectively small area may be substituted for the electron phosphor 20 shown in Fig. 1. If such an electrode is used, it will be desirable to place a shield 58 between the electrode 56 and the deflecting plates 28, 29 which is capable of absorbing the electrons impinging on it without producing secondary emission. In the center of this plate, it is desirable to have a small aperture through which the electrons may pass. Electrons impinging on the first secondary emission electrode 56 will cause the emission of secondary electrons. These, in turn, are attracted to a second electrode 60, which is at a higher positive potential, where more electrons will be emitted. Proceeding thus through several stages, the electron current will finally impinge on an anode 62 having been greatly amplified in the process. This embodiment of my invention produces a more compact apparatus and eliminates the necessity for the electron phosphor 20 shown in Fig. 1. It also permits the use of comparatively low potential differences in the electron optics system between conducting coating 14 and plate 58, for high-velocity electrons are not required for good secondary emission, whereas very high velocity electrons are required for greatest brightness when the electrons are used to excite light in an electron phosphor 20 as in Fig. 2.

In accordance with the broader aspects of my invention where it is desirable to detect a radiation for which a suitable storing phosphor is not readily available, it may be desired to place another phosphor 64 or a series of phosphors in front of the storing phosphor 8 to absorb the radiation to be detected and emit as a result thereof charged particles or other radiation to which the storing phosphor is sensitive. For instance, if fast neutrons were to be detected, a layer of hydrogenous material such as cellophane or a fissionable material such as uranium may be employed to produce charged particles to which the storing phosphor is sensitive.

The apparatus employed in one embodiment of my invention may be used to inspect a moving sheet of a material such as paper for defects of small size such as pin holes. A light is incident on the paper in a narrow band over its entire width. This band of light is opposite the radiation detector so that the radiation detector will be affected by changed intensity of the light passing through the paper. The second mirror as well as the second sweep generator are not necessary for this embodiment. Instead, the scanning is unidirectional parallel to the lighted area of the paper. In front of the storing phosphor may be placed a photoelectric layer if a storing phosphor is employed which is sensitive to electrons but which is not sensitive to light. If ultra-violet light is employed to illuminate the paper, this second layer will not be necessary if zinc sulphide or cadmium zinc sulphide are used as storing phosphors as these are sensitive to ultra-violet. By employing the storing phosphor, we are able to use a considerably slower scanning rate than would otherwise be necessary because a pinhole that passes between successive scanning would produce energy in the storing phosphor would would be released on the next sweep of the scanning beam.

In the operation of preferred embodiment of my invention, as shown in Figs. 1 and 3 the incident radiation impinges on the storing phosphor where the energy of the incident radiation is absorbed and stored until the area is flooded with a stimulating radiation at which time light photons are emitted. A large proportion of the light photons impinge on the photo-electric layer on the interior of the tube. The photo-electric layer, in turn, emits electrons. The electrons are accelerated and focused by the field produced by the transparent electrically conducting layer and the field electrodes.

Detection could also be achieved by using the complete detector as shown in the drawings with the output current from either phototube 26 or from anode 62 delivered to an oscilloscope 71 which is synchronized with the detector. An image would thus be formed, which would be visible to the eye, of the body being studied. The image thus formed at the receiving surface is shifted by the electrical field provided by the deflecting electrodes, in a manner which varies in synchronism with the scanning beam of stimulating radiation. Thus only those electrons released under the action of the stimulating radiation will impinge on the electron phosphor. The other electrons present in the tube originating from places other than that elementary area where the stimulating radiation is incident on the storing phosphor, will strike the absorbing surface. Electrons then, which constitute the dark current from all areas of the surface except that area lighted by the stimulating radiation, will be side-tracked from our detector. Thus we obtain a very high signal to noise ratio.

While I have thus far discussed my invention as giving only a measure of the total intensity of radiation striking the screen, it may also be used to produce an image. By eliminating the synchronizing circuits and holding the deflection electrodes constant, an image would be formed corresponding to the pattern on the screen. By using a lens or by holding the screen close to the object being studied, the image would show what parts of the object are most radioactive. The electron image could be formed an an electron phosphor in which case light would be given off. If the electron phosphor is selected to emit light to which the human eye is sensitive, then the image formed could be viewed directly. Thus one could obtain at a glance a complete picture of the object in question and exactly which parts are radioactive.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. For use in detecting radiation, the combination comprising an input phosphor sensitive to the radiation to be detected, said input phosphor being capable of emitting light photons as a result of said radiation to be detected impinging thereon when said input phosphor has a stimulating radiation incident thereon, a source of said stimulating radiation, a photo-electric layer near said input phosphor, said photoelectric layer being capable of absorbing the light photons emitted by said input phosphor and emitting electrons as a result thereof, focusing electrodes for establishing fields capable of accelerating and focusing the electrons emitted by said photoelectric layer, and control electrodes for establishing fields capable of changing the direction of the electron motions in such manner that the electrons impinging on a given area during one interval of time will have originated on a different part of the photo-electric layer from those impinging on the given area during the next interval of time.

2. A radiation detector comprising a transparent envelope, an input phosphor sensitive to the radiation to be detected, said input phosphor being mounted on the outside of said envelope, said input phosphor being capable of emitting light photons as a result of said radiation to be detected impinging thereon when said input phosphor has a stimulating radiation incident thereon, a source of said stimulating radiation, means for focusing said stimulating radiations substantially at a point on said phosphor, and means for scanning said focus point over said phosphor.

3. A radiation detector comprising a transparent envelope, an input phosphor sensitive to the radiation to be detected, said input phosphor being mounted external and adjacent to said envelope, said input phosphor being capable of emitting light photons as a result of said radiation to be detected impinging thereon when said input phosphor has a stimulating radiation incident thereon, a source of said stimulating radiation, means for focusing said stimulating radiations substantially at a point on said phosphor, means for scanning said focus point over said phosphor, a photo-electric layer substantially opposite said input phosphor on the inside of said envelope, said photo-electric layer being capable of absorbing the light photons emitted by said input phosphor and emitting electrons as a result thereof, focusing electrodes for establishing fields capable of accelerating and focusing the electrons emitted by said photo-electric layer, control electrodes for establishing fields capable of changing the direction of the electron motions in such manner that the electrons impinging on a given area near the opposite end of said envelope from said input phosphor during one interval of time will have originated on a different part of the photo-electric layer from those impinging on the given area during the next interval of time.

4. A radiation detector comprising a transparent envelope, an input phosphor sensitive to the radiation to be detected, said input phosphor being mounted on the outside of said envelope, said input phosphor being capable of emitting light photons as a result of said radiation to be detected impinging thereon when said input phosphor has a stimulating radiation incident thereon, a source of stimulating radiation, means for focusing said stimulating radiations substantially at a point on said phosphor, means for scanning said focus point over said phosphor, a photo-electric layer near said input phosphor on the inside of said envelope, said photo-electric layer being capable of absorbing the light photons emitted by said input phosphor and emitting electrons as a result thereof, focusing electrodes for establishing fields capable of accelerating and focusing the electrons emitted by said photo-electric layer, control electrodes for establishing fields capable of changing the direction of the electron motions in such manner that the electrons impinging on a given area near the opposite end of said envelope from said input phosphor during one interval of time will have originated on a different part of the photo-electric layer from those impinging on the given area during the next interval of time, said area being covered with an electron phosphor, a photo-multiplier sensitive to the radiation emitted by said electron phosphor.

5. A radiation detector comprising a transparent envelope, an input phosphor sensitive to the radiation to be detected, said input phosphor being mounted on the outside of said envelope, said input phosphor being capable of emitting light photons as a result of said radiation to be detected impinging thereon when said input phosphor has a stimulating radiation incident thereon, a source of said stimulating radiation, means for focusing said stimulating radiations substantially at a point on said phosphor, means for scanning said focus point over said phosphor, a photo-electric layer near said input phosphor on the inside of said envelope, said photo-electric layer being capable of absorbing the light photons emitted by said input phosphor and emitting electrons as a result thereof, focusing electrodes for establishing fields capable of accelerating and focusing the electrons emitted by said photo-electric layer, control electrodes for establishing fields capable of changing the direction of the electron motions in such manner that the electrons impinging on a given area near the opposite end of said envelope from said input phosphor during one interval of time will have originated on a different part of the photo-electric layer from those impinging on the given area during the next interval of time, said area being on an electrode of a secondary emission amplifier.

6. A radiation detector comprising an input phosphor sensitive to the radiation to be detected, said input phosphor being capable of emitting light photons as a result of said radiation to be detected impinging thereon when said input phosphor has a stimulating radiation incident thereon, a source of said stimulating radiation, means for focusing said stimulating radiations substantially at a point on said phosphor, means for scanning said focus point over said phosphor, a photo-electric layer near said input phosphor, said photo-electric layer being capable of absorbing the light photons emitted by said input phosphor and emitting electrons as a result thereof, focusing electrodes for establishing fields capable of accelerating and focusing the electrons emitted by said photo-electric layer, control electrodes for establishing fields capable of changing the direction of the electron motions in such manner that the electrons impinging on a given area during one interval of time will have originated on a different part of the photoelectric layer from those impinging on the given area during the next interval of time.

7. A radiation detector comprising a transparent envelope, an input phosphor sensitive to the radiation to be detected, said input phosphor being mounted on the outside of said envelope, said input phosphor being capable of emitting light photons as a result of said radiation to be detected impinging thereon when said input phosphor has a stimulating radiation incident thereon, a source of said stimulating radiation, means for focusing said stimulating radiations substantially at a point on said phosphor, means for scanning said focus point over said phosphor, a photo-electric layer near said input phosphor on the inside of said envelope, said photo-electric layer being capable of absorbing the light photons emitted by said input phosphor and emitting electrons as a result thereof, focusing electrodes for establishing fields capable of accelerating and focusing the electrons emitted by said photo-electric layer, an electron phosphor at the focal point of said focusing fields and means energized thereby for producing an image visible to the human eye.

8. A radiation detector comprising a transparent envelope, an input phosphor sensitive to the radiation to be detected, said input phosphor being mounted adjacent and external to said envelope, said input phosphor being capable of emitting light photons as a result of said radiation to be detected impinging thereon when said input phosphor has a stimulating radiation incident thereon, a source of said stimulating radiation, means for focusing said stimulating radiation substantially at a point on said phosphor, and means for scanning said focus point over said phosphor.

9. A radiation detector comprising a surface having thereon a storing phosphor, means for scanning said surface with a stimulating radiation to which said phosphor is sensitive, a photoelectric surface disposed adjacent to said phosphor surface so that photons from elemental areas of said phosphor surface impinge on corresponding elemental areas of said photoelectric surface, an anode of small area opposite said photo-electric surface, electron optical focusing means coordinated with said means for scanning so as to cause the electrons emitted from an elemental area of said phosphor in response to said stimulating radiation to impinge on said anode while substantially preventing electrons from other elemental areas other than that on which said stimulating radiation is impinging, from impinging on said anode.

10. A radiation detector comprising a phosphor surface which emits photons as a result of said radiation to be detected impinging thereon when stimulating radiation impinges thereon; means for scanning small elemental areas of said phosphor surface with said stimulating radiation; a photoelectric surface disposed adjacent to said phosphor surface so that photons from elemental areas of said phosphor surface impinge on corresponding elemental areas of said photo-electric surface and electron optical focusing means cooperating with said scanning means, for focusing the electrons emitted from each elemental area of said photoelectric surface as it is excited by photons from said corresponding elemental area of said phosphor surface on a common small area.

11. In a radiation-responsive device, a first layer which emits light when struck by said radiation, a second layer associated with said first layer and which emits electrons when struck by light, means for accelerating said emitted electrons to form a beam, a receiving electrode in the path of said beam, the area of said receiving electrode being small compared with the cross-section of said beam at said receiving electrode, and means for producing relative displacement between said beam and said receiving electrode.

12. In a radiation-sensitive device, a layer of material which emits light when said radiation is incident upon it, a layer of material which emits electrons when light is incident upon it, means for accelerating said electrons to form a beam and a layer of electron phosphor positioned in the path of said beam, said electron phosphor layer having an area which is small compared with the cross-section of said beam at said electron phosphor.

13. In a radiation-sensitive device, a layer of material which emits light when said radiation is incident upon it, a layer of material which emits electrons when light is incident upon it, means for accelerating said electrons to form a beam and a layer of electron phosphor positioned in the path of said beam, said electron phosphor layer having an area which is small compared with the cross-section of said beam at said electron phosphor, and means for varying the position in said cross-section which said electron phosphor occupies.

14. In a radiation-responsive device, a layer of material which is stimulated to emit as light, when a stimulating radiation falls upon it, energy stored in it by incidence of said radiation, a photoelectric layer associated with the first said layer, means for accelerating electrons from said photoelectric layer to form a beam, a receiving surface within the confines of said beam and having an area small compared with the cross-section of said beam at said surface, and means for irradiating the first said layer with said stimulating radiation.

15. In a radiation-responsive device, a layer of material which is stimulated to emit as light, when a stimulating radiation falls upon it, energy stored in it by incidence of said radiation, a photoelectric layer associated with the first said layer, means for accelerating electrons from said photoelectric layer to form a beam, a receiving surface within the confines of said beam and having an area small compared with the cross-section of said beam at said surface, means for irradiating the first said layer with said stimulating radiation, the last said means causing electrons generated by energy emanating from a given area on the first said screen to be incident on said surface only at widely spaced time-intervals.

16. In a radiation-responsive device, a layer of material which emits light in response to incidence of said radiation and does so more rapidly when irradiated by a stimulating radiation, a layer of photoelectric material associated with said first layer, means for accelerating electrons generated in said photoelectric material to form a beam, a source of said stimulating radiation, and means for causing light from a given elemental area of said first layer due to said stimulating radiation to produce incidence of electrons in said beam on an electron phosphor only at short and widely spaced time-intervals.

17. In a radiation-responsive device, a phosphor layer which emits light when struck by said radiation and which is stimulated to emit light more rapidly when a stimulating radiation is incident upon it, a layer of photoelectric material associated with said phosphor, means to accelerate electrons from said photoelectric layer to form a beam, an electron phosphor in the path of said beam having an area small compared to the cross-section of said beam at said electron phosphor, means for irradiating said phosphor layer with said stimulating radiation, and means for causing a given elemental area of said phosphor layer to produce incidence on said electron phosphor of electrons produced in said beam by said stimulating radiation for only brief and widely spaced intervals.

18. In a radiation-responsive device, a phosphor screen adapted to receive said radiation, said phosphor screen being of a kind which emits energy due to said radiation more rapidly when irradiated by a stimulating radiation, a photoelectric screen closely adjacent said phosphor screen and arranged to be excited by light emitted by said phosphor screen as a result of incidence of the first-mentioned radiation, an electron optical system arranged to focus electrons from said photoelectric screen on a receiving surface, a source of said stimulating radiation positioned to irradiate said phosphor screen, and means whereby said stimulating radiation is incident upon a given area of said receiving surface only intermittently for short time-intervals.

19. In a radiation-receiving device, a phosphor input screen which emits light responsive to said radiation, said phosphor screen being of a kind which emits energy due to said radiation more rapidly when irradiated by a stimulating radiation, a photoelectric surface adjacent said phosphor screen, an electron optical system arranged to focus electrons from said photoelectric surface into a beam, an electron phosphor receiving surface in the path of said beam and of area small compared with the area of said photoelectric surface, means for scanning said phosphor screen with a concentrated beam of said stimulating radiation.

20. In a radiation-receiving device, a phosphor input screen which emits light responsive to said radiation, said phosphor screen being of a kind which emits energy due to said radiation more rapidly when irradiated by a stimulating radiation, a photoelectric surface adjacent said phosphor screen, an electron optical system arranged to focus electrons from said photoelectric surface into a beam, an electron phosphor receiving surface in the path of said beam of area small compared with the area of said photoelectric surface, means for scanning said phosphor screen with a concentrated beam of said stimulating radiation, said electron optical system being provided with means for laterally displacing said beam in synchronism with said scanning by said stimulating radiation.

21. In combination with a source of stimulating radiant energy and a phosphor of the type that responds to said radiation by emitting photons when said stimulating radiant energy impinges thereon, means for projecting said radiation on said phosphor, means for scanning said phosphor with said radiation and indicating the intensity of the resulting photons comprising means for causing the photons to produce electrical charges, and means for deflecting spurious dark current electrical charges, produced in the region surrounding the region where said photons produce charges, away from the stream of photon-produced charges.

References Cited in the file of this patent
UNITED STATES PATENTS

| | | |
|---|---|---|
| 1,648,058 | Parker | Nov. 8, 1927 |
| 1,985,715 | Bucky | Dec. 25, 1934 |
| 1,996,492 | Schroter | Apr. 2, 1935 |
| 2,118,186 | Farnsworth | May 24, 1938 |
| 2,198,479 | Langmuir | Apr. 23, 1940 |
| 2,247,112 | Batchelor | June 24, 1941 |
| 2,248,977 | Flory et al. | July 15, 1941 |
| 2,305,179 | Lubszynski | Dec. 15, 1942 |
| 2,344,042 | Kallmann et al. | Mar. 14, 1944 |
| 2,446,248 | Shrader | Aug. 3, 1948 |
| 2,555,424 | Sheldon | June 5, 1951 |
| 2,563,472 | Leverenz | Aug. 7, 1951 |